(12) United States Patent
Wheeler

(10) Patent No.: US 10,824,295 B2
(45) Date of Patent: Nov. 3, 2020

(54) SPORTS RETRONIC WEARABLE TERMINAL

(71) Applicant: Clarence Wheeler, Atlanta, GA (US)

(72) Inventor: Clarence Wheeler, Atlanta, GA (US)

( * ) Notice: Subject to any disclaimer, the term of this patent is extended or adjusted under 35 U.S.C. 154(b) by 183 days.

(21) Appl. No.: 15/936,426

(22) Filed: Mar. 26, 2018

(65) Prior Publication Data

US 2018/0289114 A1 Oct. 11, 2018

Related U.S. Application Data

(60) Provisional application No. 62/476,761, filed on Mar. 25, 2017.

(51) Int. Cl.
| | | |
|---|---|---|
| *G06F 3/0481* | (2013.01) | |
| *A44C 5/00* | (2006.01) | |
| *A45F 5/00* | (2006.01) | |
| *G06F 1/16* | (2006.01) | |
| *A44C 15/00* | (2006.01) | |
| *A45F 3/00* | (2006.01) | |

(52) U.S. Cl.
CPC .......... *G06F 3/04817* (2013.01); *A44C 5/003* (2013.01); *A44C 5/0007* (2013.01); *A44C 5/0046* (2013.01); *A44C 15/0015* (2013.01); *A45F 2003/006* (2013.01); *A45F 2005/008* (2013.01); *A45F 2200/0516* (2013.01); *G06F 1/163* (2013.01); *G06F 1/1632* (2013.01)

(58) Field of Classification Search
CPC .................................................. G06F 3/04817
See application file for complete search history.

(56) References Cited

U.S. PATENT DOCUMENTS

| | | | | |
|---|---|---|---|---|
| 5,183,193 A | * | 2/1993 | Brandell | A45F 3/50 224/219 |
| 5,650,945 A | * | 7/1997 | Kita | G04G 21/025 235/105 |
| 6,619,597 B1 | * | 9/2003 | Sheppard | A47B 21/0371 248/118 |
| 9,467,553 B2 | * | 10/2016 | Heo | H04M 1/0202 |
| 9,687,713 B1 | * | 6/2017 | Duke | A63B 24/0021 |
| 2003/0164389 A1 | * | 9/2003 | Byers | A44C 5/0007 224/221 |
| 2008/0138551 A1 | * | 6/2008 | Gordon | G11B 33/0444 428/35.7 |
| 2008/0143685 A1 | * | 6/2008 | Lee | G06F 3/04817 345/173 |
| 2010/0006614 A1 | * | 1/2010 | McLean | A45C 11/00 224/577 |
| 2010/0026915 A1 | * | 2/2010 | Pozin | B42D 1/08 348/838 |
| 2011/0240830 A1 | * | 10/2011 | Alemozafar | F16M 13/00 248/689 |
| 2012/0221966 A1 | * | 8/2012 | Inami | G06F 1/1641 715/761 |

(Continued)

FOREIGN PATENT DOCUMENTS

| | | | | |
|---|---|---|---|---|
| JP | 2000214277 A | * | 8/2000 | |
| WO | WO-2016125847 A1 | * | 8/2016 | G04B 43/00 |

*Primary Examiner* — Michael McCullough

(57) ABSTRACT

The present invention discloses a wearable terminal worn by athletes. The wearable terminal comprises a display portion, body portion, wrist sleeve, docking platform, smartphone components and many other micro-components.

5 Claims, 9 Drawing Sheets

(56) References Cited

U.S. PATENT DOCUMENTS

| | | | |
|---|---|---|---|
| 2014/0164991 A1* | 6/2014 | Kim | G06F 3/0488 |
| | | | 715/794 |
| 2014/0351748 A1* | 11/2014 | Xia | G06F 3/0481 |
| | | | 715/798 |
| 2015/0091780 A1* | 4/2015 | Lyren | G02B 27/017 |
| | | | 345/8 |
| 2015/0097558 A1* | 4/2015 | Jin | H04B 1/3888 |
| | | | 324/226 |
| 2015/0115943 A1* | 4/2015 | Jin | H04M 1/0245 |
| | | | 324/226 |
| 2017/0261941 A1* | 9/2017 | Liu | G04G 9/10 |
| 2017/0319134 A1* | 11/2017 | Lee | G04G 17/04 |
| 2019/0121522 A1* | 4/2019 | Davis | G06F 3/04845 |

* cited by examiner

SPORTS RETRONIC WEARABLE TERMINAL

CROSS-REFERENCES TO RELATED APPLICATION

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

Field of the Invention

The invention generally relates to the field of wearable terminals. More specifically, the invention relates to a sports wearable terminal with capability's to preform wireless communication tasks operations and may contain many components.

Related Art

Known as of today, their are a many different types of terminals, for example as the likes of a smart-watches, personal digital assistants (PDA), smart-phones, tablets, laptops, etc. terminals, some of these devices serve different purposes and may be used for differently such as internet access, voice calling, messaging, video watching, receiving/sending picture/videos, music listening/sharing, gaming, GPS navigation, calendar synchronization, work out coaching/tracking, and health related/tracking detection.

BRIEF SUMMARY OF THE PRESENT INVENTION AND ADVANTAGES

The present invention comprises the field of terminals, that may preform many different tasks and operations and may include a projection component that may project a image, or a Users Interface (UI) onto an object or in a space. This type of terminal is configured to be worn like a watch, wristband, sweatband or similar object around the wrist and/or arm of a user. Furthermore, the wrist terminal may include a flexible protective layer which may be coupled on the top portion of the display portion which is mounted on top of a metallic, aluminum, plastic or similar material case comprising a OLED, AMOLD, or LCD, light source. The wrist terminal may include a mini (LED or Floursent) Pico projector for displaying images onto an object and/or a space, the mini projector may be installed on the side and/or top portion of a wrist terminal coupled to the BP (body portion). The wrist terminal furthermore, may include a flexible solar and/or a secondary cell underneath the display portion, intended to recharge a solar powered compartment within the wrist terminal, the solar cell may further be powered by all types of light sources. The wrist terminal further includes a band made of a rubber, silicon, cotton or similar type of material that would allow the band to be stretchy and/or accustom fit many different wrist and/or arm sizes without the need for adjustment. Furthermore, underneath or inside of the terminal case may include a flexible printed circuit board/motherboard designed for hard impacts and sever weather conditions and temperatures. The printed circuit board/motherboard containing several mini micro smart-phone components, WIFI and Bluetooth chipset, an auto image/video correction processor, mini processor, controller, several other sensors, intended to power the wrist terminal and it components to exchange and receive image and/or video data, make telecommunication calls, text and video messaging, SMS, and store data files. The wrist terminal may furthermore be water-resistance making the device substantial to all weather conditions. Furthermore, the wrist terminal may also include a Sports Retronic Coach (SRC) Application Software this may be a CD-ROM (Compact Disc Read-Only Memory), DVD (Digital Versatile Disc), Floppy Disk, USB etc. The present invention includes a (SRC) Application Software that may enable a user to create a sports formations and may also enable a user to wirelessly transmit the sports formation from a external terminal to the Sports Retronic Band and/or Sports Retronic Coach, via the Sports Retronic Band and/or Sports Retronic Coach being connected to a wireless communication network.

DETAILED DESCRIPTION OF THE INVENTION

Describing a Sports Retronic Band and/or Wrist Coach. In this description the Sports Retronic Band and/or Wrist Coach 1 may be used to wireless communicate and receive data information from an external terminal, note the external terminal may require the (SRP) Application Software to be install in order to transmit a compatible multimedia file to the Sports Retronic Band or Wrist Coach.

Figure 1:
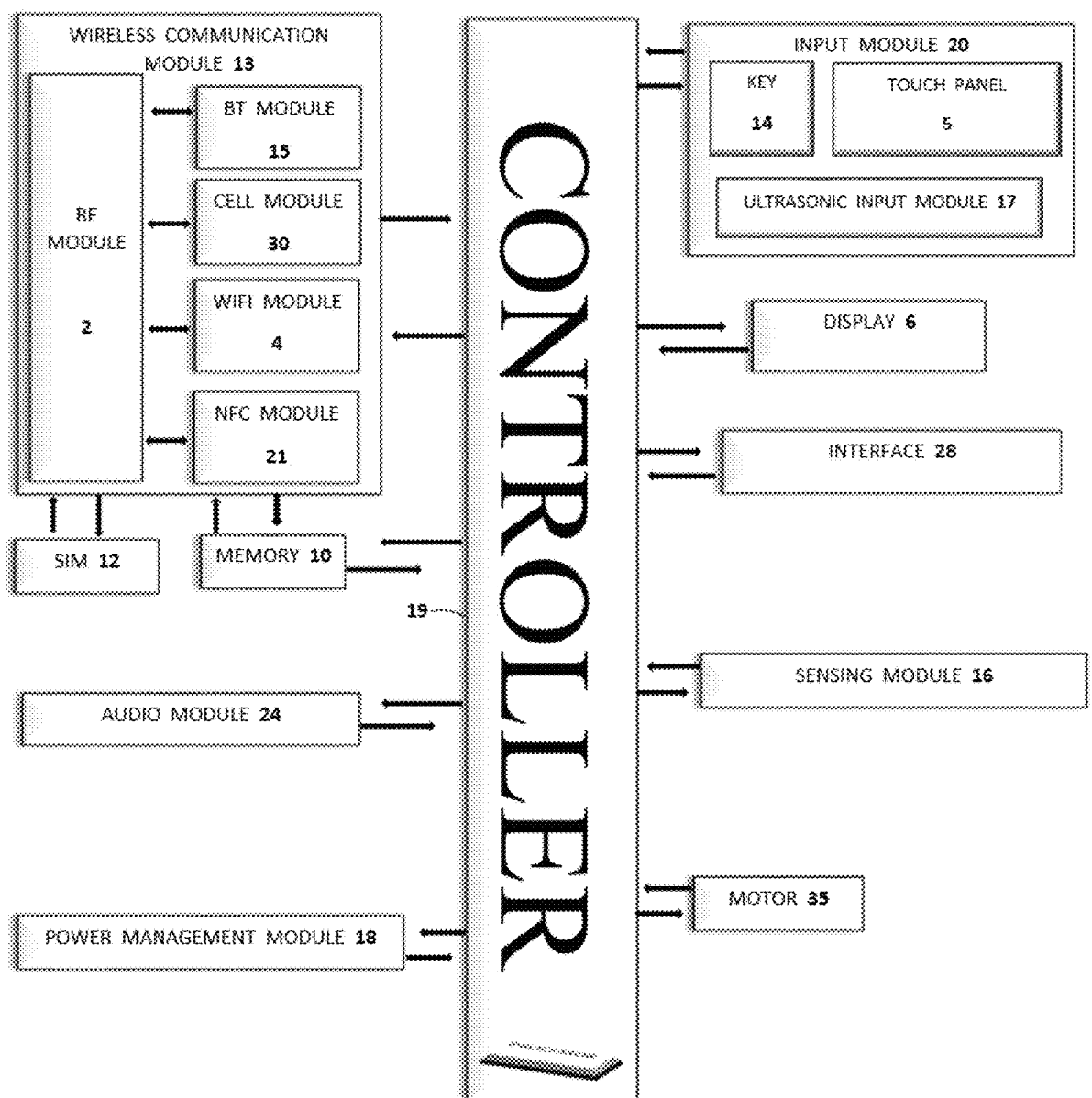
FIG. 1 is a shape diagram for describing a Sports Retronic Band and/or Wrist Coach.

FIG. 1 is a shape diagram of a Sports Retronic Band and/or Wrist Coach 1. Furthermore, the Sports Retronic Band and/or Wrist Coach 1 may include a Quad or Octa core processor which may control a multitude of hardware or software components that may be connected thereon and may also perform various data processing and operations by executing an operating system or an application program. The processor may be implemented with a system on chip (SoC). The processor may further include a graphic processing unit (GPU) and/or an image signal processor. For example, the processor duties may be to load commands or data received from at least one of the components and process them and store various data in a nonvolatile memory. The cellular module 30, for example, may allow a user to place voice and video calls, text service, or internet service through communication network. The cellular module 30 may perform a distinction and authentication operation on the Sports Retronic Band and/or Wrist Coach 1 in a communication network by using the SIM card (smart card) 12. The cellular module 30 may also perform a part of a function provided by the processor, the cellular module 30 may also include a communication processor (CP).

The wireless communication module 13 allows wireless communication which may enable the remote interaction between the Sports Retronic Band and/or Wrist Coach 1 and an external device and or via internet, which may include communication systems as GSM (Global System for Mobile Communication) TDMA, CDMA (Code Division Multiple Access), PAN (Personal Area Network), NFC (Near Field Communication), Zigbee, Bluetooth, RFID (Radio Frequency Identification) IrDA, (Infrared Data Association), LAN (Local Area Network), WIFI, MAN (Metropolitan Area Network) WiMAX (World Interoperability for Microwave Access), HSDPA (High Speed Downlink Packet Access), WAN (Wide Area Network), Wibro (Wireless Broadband), UMTS, LTE, 5g and 6g ($5^{th}$ and 6 Generation Wireless System), OFDM (Orthogonal Frequency-Division Multiple Access), MC-CDMA (Multi-Carrier Code-Division Multiple-Access), LAS-CDMA (Large Area Synchronized Code Division Multiple Access), UWB (Ultra-Wideband), LMDS (Local Multiple Distribution Service), IPV6 (Internet Protocol Version 6), DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial), GNSS (Global Navigation Satellite System)/GPS (Global Positioning System), and RF (Radio Frequency) communication systems. These varieties of wireless communication systems may be intergraded into the Sports Retronic Band and/or Wrist Coach 1 wireless communication module 13 intended to serve many different tasks which may be to transmit voice, video, and data in local and wide range areas, by sending magnetism signals through the air, transmitters and receivers may be positioned at a certain position, using an aerial or antenna, at the transmitter the electrical signal leave the antenna to create electromagnetic waves that radiate outwards to wirelessly communicate. For example in FDMA, the transmitting and receiving frequencies used in each cell are different from the frequencies used in the neighboring cells. The principle of CDMA is more complex and the distributed transceivers can select one cell and listen to it. Other methods include Polarization Division Multiple Access (PDMA) and Time Division Multiple Access (TDMA). Time division multiple access is used in combination with either FDMA or CDMA to give multiple channels within the coverage area of a single cell. While on the other side some of these systems may be used to effectively distribute audio and video content to a Sports Retronic Band and/or Wrist Coach 1 using electromagnet spectrum (radio waves). The wireless communication module 13 may include a processor for processing data transmitted/received through a corresponding module and or may be included in one integrated chip (IC) or IC package. The RF module 2, for example, may be used to transmit/receive communication signals. The RF module 2 may include a transceiver, a power amp module (PAM), a frequency filter, a low noise amplifier (LNA), or an antenna. A cellular module 30, WIFI module 4, BT module 15, NFC module 21 may transmit/receive RF signals through a separate RF module. The Sports Retronic Band and/or Wrist Coach 1 may include a SIM 12 or a embedded SIM (Subscriber Identification Module (SIM)) a type of smart card used in mobile phone. The SIM 12 is a detachable smart card containing the user's subscription information and phone book. This allows the user to retain his or her information even after switching off the handset. Alternatively, the user can also change service providers while retaining the handset simply by changing the SIM 12. The SIM 12 may securely store the service subscriber key. The Sports Retronic Band and/or Wrist Coach 1 may include memory 10, an internal memory that may comprise a SSD (Solid State Drive), NAS (Network Attached Storage), Dual-Channel RAM (Random Access Memory), Multi-ROM (Read-Only Memory), Flash Memory (Flash Memory Type), Hard Disk (Hard Disk Type), Multimedia Card Micro (Multimedia Card Micro Type), SRAM (Static Random Access Memory), EEPROM (Electrically Erasable Programmable Read-Only Memory), PROM (Programmable Read-Only Memory), may further include a card type memory Compact Flash (CF), Secure Digital (SD), Micro Micro-SD, Mini-SD, Extreme Digital (xD), Multimedia Card (MMC) or a memory stick. The external memory may be functionally and/or physically connected to the Sports Retronic Band and/or Wrist Coach 1, these components may be the most crucial of the Sports Retronic Band and/or Wrist Coach 1 processing cores and dedicated graphics, alternatively some components of the memory 10 may store the Sports Retronic Band and/or Wrist Coach 1 operating system components, application data, game graphics and critical system files, many of the previously mentioned files and systems may be separated to different storage chips throughout the Sports Retronic Band and/or Wrist Coach 1 main board or printed circuit board. The memory 10 may store programs or commands for the Sports Retronic Band and/or Wrist Coach 1. The controller 19 may execute the programs and/or commands stored in the memory 10. The controller 19 may control the overall operations of the Sports Retronic Band and/or Wrist Coach 1, and may process and execute a plurality of tasks and functions within the Sports Retronic Band and/or Wrist Coach 1, the controller 19 may set an execution environment of the Sports Retronic Band and/or Wrist Coach 1, hold information thereof, and make data input/output exchange for all elements of the Sports Retronic Band and/or Wrist Coach 1. Furthermore, the controller 19 can perform a corresponding communication service function through the wireless communication module 13. Also, the controller 19 can include a Multimedia Module Coder/Decoder (CODEC) for converting a video signal through the touch panel 5. For example, the controller 19 may recognize a file opening execution region on the display 6 portion upon a file, widget, or application icon reaching the specific region on the display 6, further when a file, icon, widget, or application is itemized by a user input (pressure input) the controller 19 recognize this command as an itemizing command. Upon a user itemizing a specific icon the controller 19 may display an invisible file opening execution region this region may be positioned on the middle left hand portion of the display 6 on the first screen, in response to the icon reaching the file opening execution region the controller 19 may sense the geographical location of the moving icon once the icon passes this region the controller 19 may process the file opening execution command. The Sports Retronic Band and/or Wrist Coach 1 may include a power management that may be an off-chip ex. (module) or on-chip, duties to manage the power of the Sports Retronic Band and/or Wrist Coach 1. The power management module 18 may include a power management IC (PMIC), a charger IC, or a battery gauge, for example. The PMIC may have a wired and/or wireless charging capabilities. The wireless charging process may be a magnetic resonance process, a magnetic induction process, or an electromagnetic process, an additional circuit for wireless charging, such as a circuit, a coil loop, a resonant circuit, or a rectifier circuit. The on-chip power management circuit may operate from one or more batteries, solar power source, line power, mechanical power source, photovoltaic power source, thermal power source, radio frequency (RF) power source, vibration power source, bio-mechanical power source, fuel cell and/or any other power source. In particular, the on-chip power management module may selectively supply power supply signals of different voltages, currents, current limits or with adjustable voltages, currents or current limits in response to power mode signals received. The on-chip power management circuit may be implemented as a multi-output programmable power supply, that may receive power the mode signal and may generate optionally routes the power supply signals to a particular port, pin or pad or directly to peripheral devices via a switch matrix, as commanded based on the power mode signal.

Furthermore, the Sports Retronic Band and/or Wrist Coach 1 may incorporate a camera module 31 at various locations of the Sports Retronic Band and/or Wrist Coach 1, and may substantially process an image frame, a still, moving, or both still and moving images and videos obtain images, and may include image sensors, a lens, image signal processors (ISP), or a flash. Once captured or stored these images may be transferred to the Sports Retronic Band and/or Wrist Coach 1 memory 10 or to an external terminal through the wireless communication module 13. The Sports Retronic Band and/or Wrist Coach 1 may include an input module 20 which may be composed of a key 14, touch panel (static pressure/electrostatic) 5, and an ultrasonic input module 17, the touch panel 5 may use at least one of capacitive, resistive, infrared, or ultrasonic method, for example. Additionally, the touch panel 5 may further include a control circuit, alternatively the touch panel 5 may further include a tactile layer to provide tactile response to a user. The key 14 may include a physical button, an optical key, or a keypad, the ultrasonic input module 17 may detect ultrasonic waves generated from an input tool through the microphone in order to verify data corresponding to the detected ultrasonic waves. In particular, the Sports Retronic Band and/or Wrist Coach 1 audio module 24 may be a speaker type that may receive call mode, voice recognition, voice recording, and broadcast reception mode from the wireless communication module 13 and or output audio sound or sound data that may be stored inside of the Sports Retronic Band and/or Wrist Coach 1 memory 10, external storage, or transmitted from an external terminal. Sensing module 16 may measure physical quantities or detect an operating state of the Sports Retronic Band and/or Wrist Coach 1, thereby converting the measured or detected information into electrical signals, and may accommodate many different sensors (ex. gesture sensor 25, gyro sensor 11, barometric sensor 8, magnetic sensor 26, acceleration sensor 9, grip sensor 3, proximity sensor 27, temperature/humidity sensor 32, illumination sensor, infrared (IR) sensor 7. The sensing module 16 may further include a control circuit which may control at least one sensor therein and an additional processor to control the sensing module 16 while the main processor may be in a sleep or consumption state. For example, sensing the current state of a Sports Retronic Band and/or Wrist Coach 1, such as opening or closing the Sports Retronic Band and/or Wrist Coach 1, the position of the Sports Retronic Band and/or Wrist Coach 1, user contact presence, orientation of the Sports Retronic Band and/or Wrist Coach 1, acceleration/deceleration of the Sports Retronic Band and/or Wrist Coach 1 to generate a sensing signal for controlling the operation of the Sports Retronic Band and/or Wrist Coach 1. Further, the sensing module 16 may be responsible for sensing functions related to whether or not the external device coupling the power management module 18 supplies power. Meanwhile, the sensing module 16 may include a proximity sensor 27. Another example of the sensing module 16 may be a gyro sensor 11 which may be used to sense the change of angles and direction of an itemized file, widget, or application icon on the display 6, a distance sensor which may detect the file opening execution region and the distance of the file upon reaching the file opening execution region, when the file, widget, or application icon is itemized, these sensor signals may be transmitted to the controller 19 to further preform a file opening execution command. As it will be later associated with the controller 19 it will be described below. In addition, the gyro sensor 11 and an acceleration sensor 9 for calculating the geomagnetic sensor 26 direction of rotation of calculating the moving direction when the user moves. The display 6 may be a LCD (Liquid Crystal Display), a thin film TLCD (Transistor-Liquid Crystal Display), OLED (Organic Light-Emitting Diode), a Flexible Display, 3-D Display (may include at least one of 3D displays) and may incorporate a touch sensor. Some of these displays may be configured to be transparent to view the outside through them. This may be called a transparent display, for example a transparent display and the like (Transparent Organic Light Emitting Diode) TOLED. The display 6 according to the implementation of the Sports Retronic Band or Wrist Coach 1 may also be two or more. For example, it may be provided in the Sports Retronic Band or Wrist Coach 1 at the same time the external display module (not illustrated) and an internal display module (not illustrated). The touch panel 5 may be configured to detect even a touch input as well as the position and area of the touch input pressure. The interface 28 may include a high-definition multimedia interface (HDMI), a universal serial bus (USB), an optical interface, or a D-subminiature (sub). Alternatively, the interface 28 may include a mobile high definition link (MHL) interface, secure digital (SD) card/multi-media card (MMC) interface, or an infrared data association (IrDA) standard interface. Furthermore, the Sports Retronic Band and/or Wrist Coach 1 may include a projector 23, including a (OLED) organic light emitting diodes or (Fluorescent) light source which may project an image onto an object. Fluoro light source may emit light to a first wavelength and may irradiates excitation light onto the fluorophore, optical element, quarter-wave plate, and a fluorophore unit. Fluorophore unit may include a fluorophore that emits fluorescent light by irradiation of light of the first wavelength, the fluorophore unit may also emit fluorescent light of a wavelength that differs from the first wavelength, and a reflection region that reflects light of the first wavelength. The fluorophore unit may be able move such that light from the light source successively irradiated on the fluorophore region and the reflection region. The optical element may separate light of the first wavelength into a first linearly polarized light component, a second linearly polarized light component that may be orthogonal to the first linearly polarized light component which may guide the first linearly polarized light component that may be emitted from the light source to the fluorophore unit. Light that may be reflected by the reflection region and light emitted by the fluorophore region may be irradiated into the optical element. The optical element emits light of the first wavelength that was reflected by the reflection region and fluorescent light that was emitted by the fluorophore region in the same direction. Image formation module may be used to spatially modulates light from the illumination optical system, a lens that may be various types of shape and couture, and may be at various locations of the Sports Retronic Band and/or Wrist Coach 1 which may projects light that may be spatially modulated by an image formation module. (OLED) organic light emitting diodes light source may include similar components as of the likes of the fluorescent system but may differ as explained the light is shined through a spinning color wheel onto a chip that is mounted with hundreds of thousands of tiny mirrors. The mirrors are turned off or on by electronic impulses according to the need for the color at that moment. Even though only one color is shown at a time, one color follows another so quickly that the primary colors seem to blend into the appropriate color. The image appears to be constantly lit, when in fact small parts of it are constantly flickering, may be referred to as digital light processing. A projection adjustment module may determine the magnitude relation translational variation value, predetermined a first threshold value and the variation value with a predetermined angle of the second magnitude threshold.

Additionally, the sensing module 16 may be incorporated into the projection process for example, a gyro sensor of the sensing module 16 may be used to sense the change of angles of a projected image in a space, a distance sensor which may detect an operating point and may coordinate touch points on the display 16 screen when display 16 may be in a three-dimensional display 16 screen mode, and may transmits coordinates of the operating point to a processor. The Sports Retronic Band and/or Wrist Coach 1 may include a (GPU) Graphics Processing Unit for mobile TV support. The GPU may process media data according to the standards such as digital multimedia broadcasting (DMB), digital video broadcasting (DVB). This type of processor may also render images, animations and video for the Sports Retronic Band and/or Wrist Coach 1 display 6. Motor 35 may convert electrical signals into mechanical vibration and may generate vibration or a haptic effect.

Figure 2A:
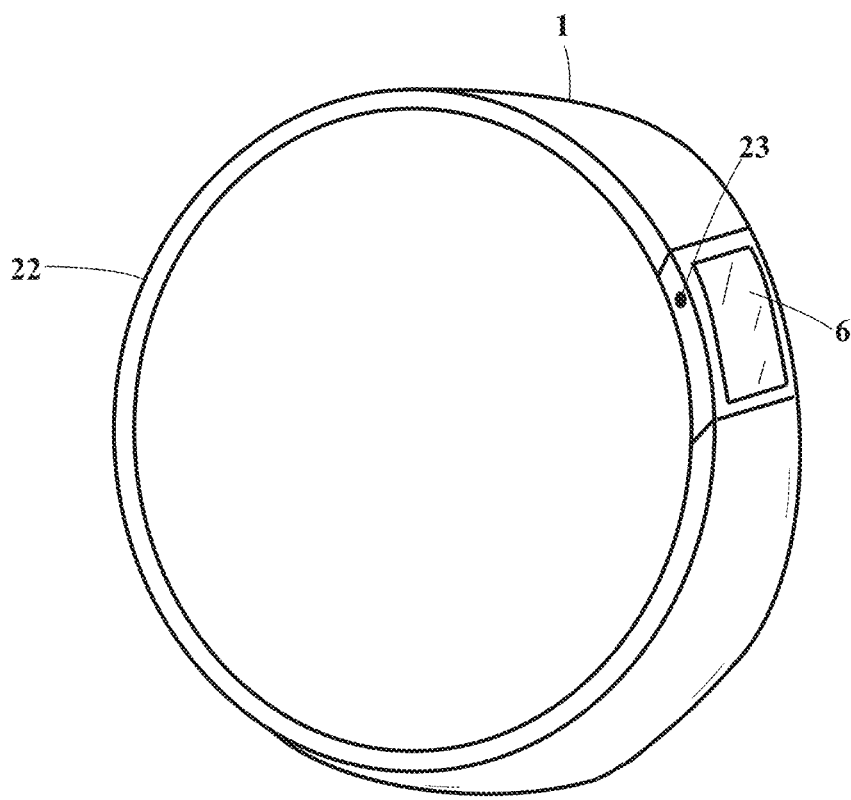
FIG. 2A-2B is a perspective view, illustrating a Sports Retronic Band and/or Sports Retronic Coach.
Figure 2B:
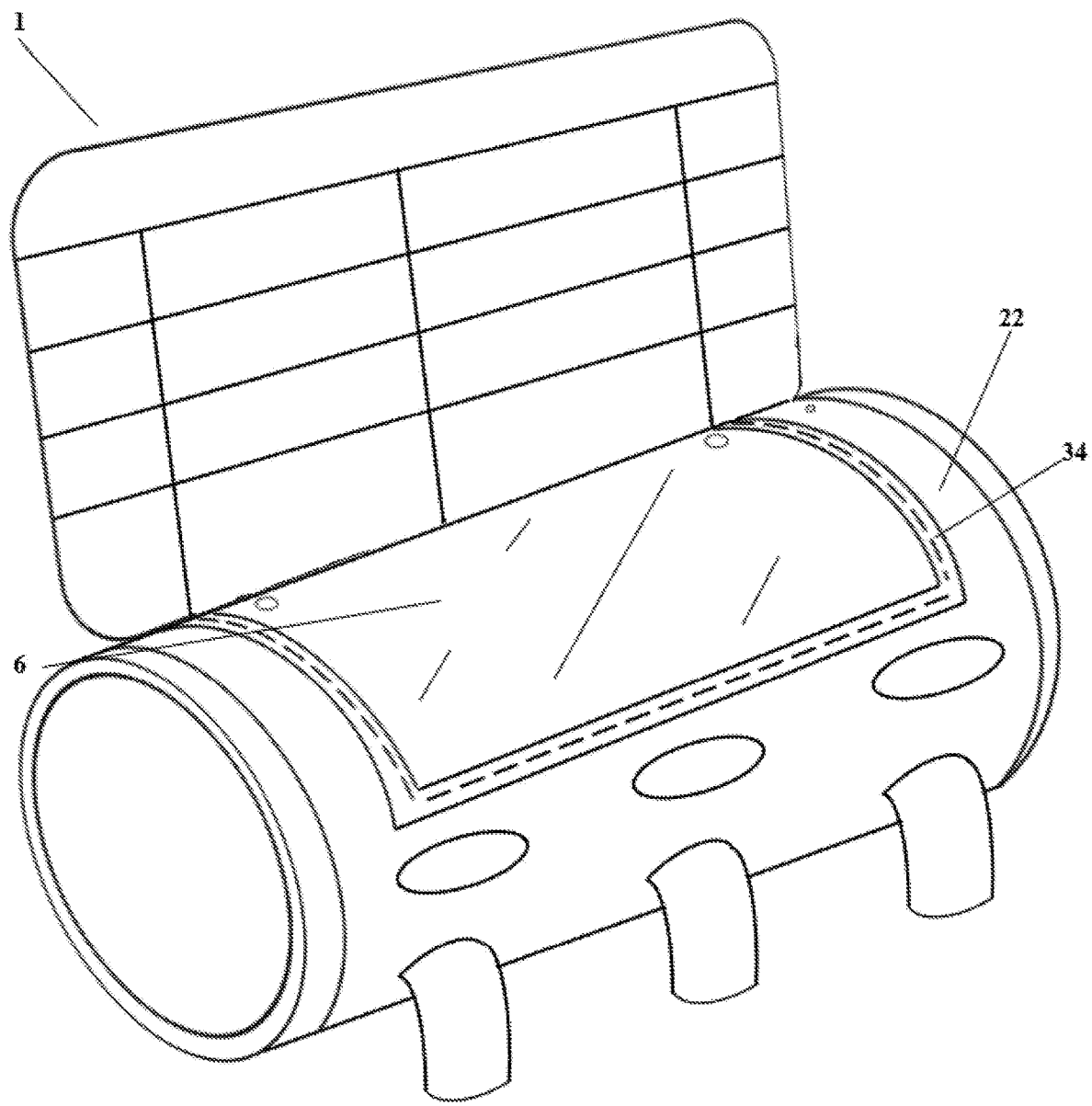

FIG. 2A-2B is an illustration of the Sports Retronic Band and Sports Retronic Coach 1, please note that the Sports Retronic Band and/or Wrist Coach 1 may include similar features, systems and components to operate communicate and or transmit data information from terminal to terminal.

Further, FIG. 2A the Sports Retronic Band 1, is a wrist wearable terminal as the likes of a watch or bracelet. Further, including a BP (body portion) comprising a case 34 which may be made of materials as of metallic, aluminum, titanium, injection-mold, plastic, rubber, thermoplastic, thermoset, or similar types of material but not limited to the above said elements couple to the band 22, a flat shape display 6 portion (previously described in FIG. 1) which may be located at the top side set at a vertical position coupled to the BP of the Sports Retronic Band 1, further including a band 22 coupled to the BP of the Sports Retronic Band 1 by pins at each end of the BP, the band 22 may be made of materials such as rubber, plastic, silicone, cotton, or genetically designed engineered materials, designed to accommodate different wrist and arm sizes, in the event of the Sports Retronic Band 1 comprising a docking station 33 the docking station 33 may be coupled to both ends of the band 22 by pins at each end of the band 22 allowing the BP (body portion) of the Sports Retronic Band 1 to be attached and detached from the docking station 33 by a push-in method FIG. 4. Further, the band 22 may include a (not illustrated) display portion around the outer edges (rim) of the band 22, the band display portion may include a band display surface perpendicular to or crossing the band 22 side direction, and may display an image through the band 22 display surface. The band display may have a curved or oval shape to correspond to the edge when viewed from the front direction. The Sports Retronic Band 1 may also include an input module 20 (previously described in FIG. 1). Furthermore, the Sports Retronic Band 1 may include a camera module 31 and audio module 24 (previously described in FIG. 1) coupled to the BP of the Sports Retronic Band 1. Further, including a mini Pico projector 23 (previously described in FIG. 1) coupled to the BP of the Sports Retronic Band 1. Further, a cellular module 30 (previously described in FIG. 1) for connecting to a cellular network in the action of receiving data information from a external terminal. And may further include a wireless communication module 13 (previously described in FIG. 1) for connecting to a wireless communication.

Referring to FIG. 2B the Sports Retronic Coach 1, is a foldable wrist wearable terminal that may be folded using hinge(s). Further, the Sports Retronic Coach 1 may include similar features and components as the mentioned above Sports Retronic Band 1. The Sports Retronic Coach 1 may switch its screen according to a state of the terminal. Throughout the specification, a state of an terminal may be defined to two states that area folded state and an open state. The folded state and the open state will be described in greater detail later. Further, including a BP (body portion) comprising a square or rectangle shape case 34 which may be made of materials as of metallic, aluminum, titanium, injection-mold, plastic, rubber, thermoplastic, thermoset, or similar types of material but not limited to the above said elements couple to the band 22 by pins at both ends where the band 22 meets the BP of the Sports Retronic Coach 1, an oval and rounded shape contour display 6 positioned horizontally coupled to the BP top portion of the Sports Retronic Coach 1, the display 6 portion (previously described in FIG. 1) may be located underneath a flap portion, whereas the flap portion is coupled to the BP of the Sports Retronic Coach 1 by hinge(s) that may be positioned at the middle, far left, and far right side, of back side of the BP of the Sports Retronic Coach 1 and symmetrically met with the flap portion. The flap portion may include a velcro material coupled by a bounding agent around the inner edges of the flap portion to attach to the BP of the Sports Retronic Coach 1. A button, belt buckle, or other type of means for securing the flap portion to the BP of the Sports Retronic Coach 1. Further, including a band 22 coupled to the BP of the Sports Retronic Coach 1 by pins at each end of the BP where the BP meets the band 22, the band 22 may be made of materials such as rubber, plastic, silicone, cotton, or genetically designed engineered materials, designed to accommodate different wrist and arm sizes. The Sports Retronic Band 1 may also comprise a docking station 33 as mentioned above. The Sports Retronic Coach 1 may also include an input module 17 (previously described in FIG. 1). Furthermore, the Sports Retronic Coach 1 may include a camera module 31 and audio module 24 (previously described in FIG. 1). Sensing module 16 (previously described in FIG. 1) may also be implemented on the Sports Retronic Band and/or Wrist Coach 1. And may include a wireless communication module 13 (previously described in FIG. 1). Furthermore, the Sports Retronic Band and/or Sports Retronic Wrist Coach 1, may comprise synchronization and/or being paired to an external terminal such as a (laptop, tablet, or desktop) but not limited to any other external terminal in order to wirelessly communicate to receive multimedia data information (ex. multimedia files videos, still/moving images). For example, the external terminal which the Sports Retronic Band and/or Wrist Coach 1 may be synchronized and/or paired with may incorporate the Sport Retronic Playmaker (SRP) Application Software this may be a computer-readable medium which may contain, store, communicate, propagate, or transport the software instruction execution system, between terminals or means with the instruction execution system. Examples of a computer-readable medium may be a portable computer diskette cartridge (magnetic device), a random-access memory (RAM), a read only memory (ROM), erasable read-only memory edit (EPROM or flash memory), an optical fiber device, digital video disk (DVD), USB flash drive, internet link download, or a portable compact disc read-only memory (CDROM). In the event of the creating, designing, editing, and wirelessly transmitting a (SRP) multimedia file from the external terminal to the Sports Retronic Band and/or Sport Retronic Wrist Coach, a user may install the (SRP) Application Software onto an external terminal once installed onto such external terminal, both user may connect to a wireless communication network. Traditionally, the Sports Retronic Band and/or Sports Retronic Wrist Coach 1 may include a pre-installed Sports Retronic Viewer (SRV) Utility Application. The (SRV) Application may be multifunction application, for example this application may allow a user to view a (SRP) multimedia file on the display 6, store a (SRP) multimedia file, and execute execution task to transmit a (SRP) multimedia file to be output through the projector 23.

Figure 3:
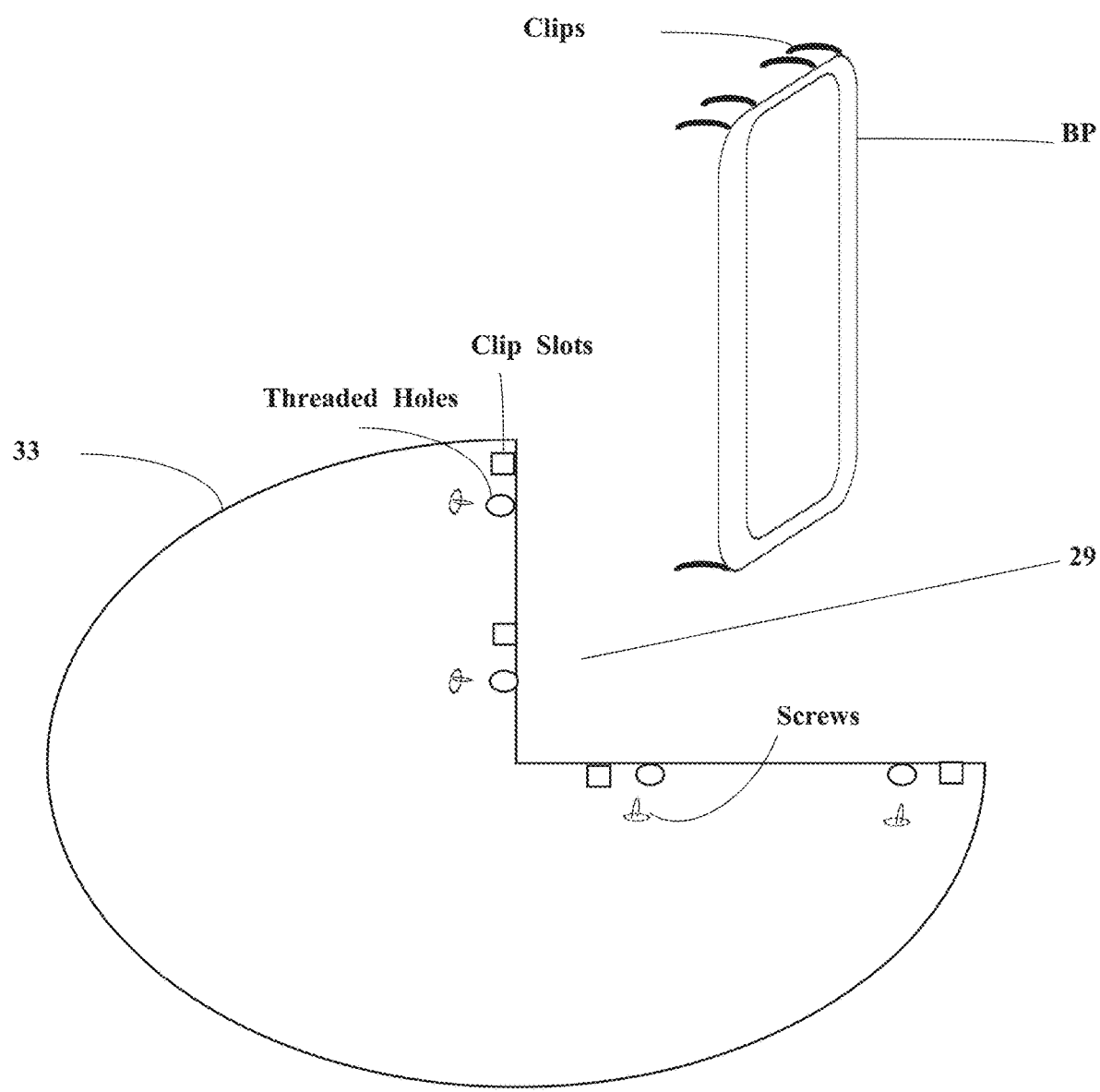
FIG. 3 is a perspective view, showing how the BP (body portion) of the Sports Retronic Band and/or Wrist Coach may be docked to the band docking station.

FIG. 3 is a view showing how the Sports Retronic Band and/or Wrist Coach 1 BP (body portion) may be attached and detached from the Sports Retronic Band and/or Wrist Coach 1 docking station 33, the BP of a Sports Retronic Band and/or Wrist Coach 1 may be capable of docking into the docking station 33. The docking station 33 may be coupled to each ends of the band 22. Alternatively, the docking station 33 may include a cavity or basin for receiving an edge or end of the Sports Retronic Band and/or Wrist Coach 1 and may be better known as a cavity or basin style docking station 33.

FIG. 3 shows, the BP of the Sports Retronic Band and/or Wrist Coach 1 may be attached to the docking station 33 by use of clips, and screws but not limited to any fashion of holding the BP of the Sports Retronic Band and/or Wrist Coach 1 in place. The clips may be made of a stainless steel, aluminum, or injection molded material, and the screw may be made of a metal or stainless-steel material. These element or components may be coupled to a first bottom side of the BP of the Sports Retronic Band and/or Wrist Coach 1. Furthermore, the docking station 33 may include holes/slots implemented into the docking station 33 cavity 29 portion to allow the clips, and screws to be securely fitted into a place. The BP of the Sports Retronic Band and/or Wrist Coach 1 may be attached to the cavity 29 portion of the docking station 33 by firmly positioned lining the clips and holes/slots together and firmly pressing the BP of the Sports Retronic Band and/or Wrist Coach 1 into the holes/slots. Further, the first underneath bottom side of the BP of the Sports Retronic Band and/or Wrist Coach 1 may include threaded holes, the cavity 29 portion of the docking station 33 may also include threaded hole. When both Sports Retronic Band and/or Wrist Coach 1 and cavity 29 portion are symmetrically met the screws may be inserted into the docking station 33 from the underneath outer bottom side of the docking station 33 into the bottom side portion of the BP of the Sports Retronic Band and/or Wrist Coach 1 firmly screwed, meaning the screws runs through the underneath bottom side of the docking station 33 into the underneath bottom side of the Sports Retronic Band and/or Wrist Coach 1. This holding system may be configured to support the Sports Retronic Band and/or Wrist Coach 1 in an upright (e.g., vertical), laid down (e.g., horizontal) or tilted position (e.g., angled) while maintaining/allowing access to the BP of the Sports Retronic Band and/or Wrist Coach 1. The docking station 33 may also include a power transfer component inside of the cavity 29 portion. In the case of a band 22 that may compose of internal electrical components within the band 22, the docking station 33 may include connectors, jacks, ports or transceivers that provide external connections to the underside of the BP of the Sports Retronic Band and/or Wrist Coach 1. In order to operatively connect the BP of the Sports Retronic Band and/or Wrist Coach 1 with the docking station 33, the docking station 33 may include various components for transferring data and/or power between the Sports Retronic Band and/or Wrist Coach 1 and the docking station 33. For example, both the Sports Retronic Band and/or Wrist Coach 1 and the docking station 33 may include a power transfer component and a data transfer component. When docked, the data transfer component may transfer data between the docking station 33 and the Sports Retronic Band and/or Wrist Coach 1. For example, this data information may be the images displayed on the band display. Furthermore, the Sports Retronic Band and/or Wrist Coach 1 power transfer component may transfer power from the Sports Retronic Band and/or Wrist Coach 1 to the band 22 electrical components.

Figure 4:
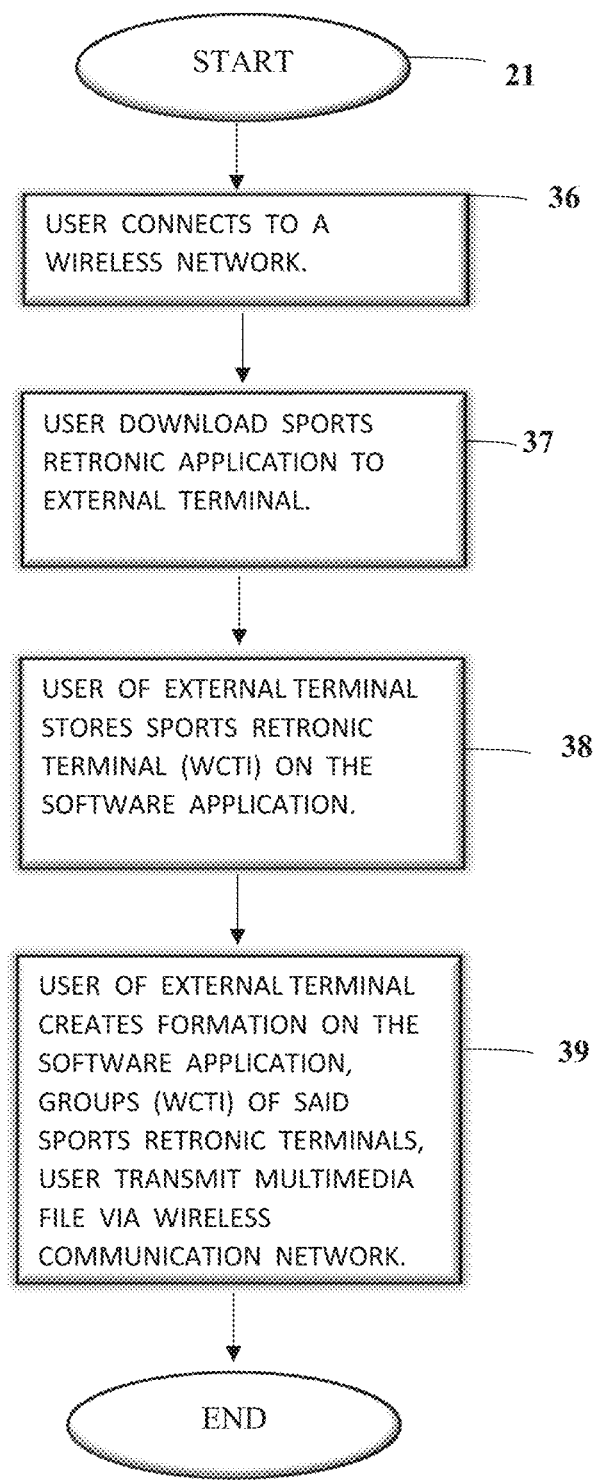
FIG. 4 is a shape diagram illustrating method steps of how a user may control the SRP Application Software.
Figure 4B:
FIG. 4B is an illustration of FIG. 4.
Figure 4B:
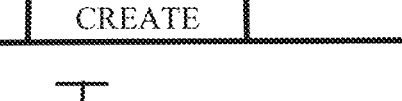

Referring to FIG. 4, the method 21 starts with step 36 whereas the operator of the external terminal establish a wireless connection this connection may be a Wireless Local Area Network (WLAN), Wireless Wide Network Area (WWNA), WIFI, WiMAX (World Interoperability for Microwave Access), GSM (Global System for Mobile Communication), TDMA, CDMA (Code Division Multiple Access), PAN (Personal Area Network), HSDPA (High Speed Downlink Packet Access), WAN (Wide Area Network), Wibro (Wireless Broadband), UMTS, LTE, HSPA, 5g and 6g ($5^{th}$ and 6 Generation Wireless System), OFDM (Orthogonal Frequency-Division Multiple Access), MC-CDMA (Multi-Carrier Code-Division Multiple-Access), LAS-CDMA (Large Area Synchronized Code Division Multiple Access), UWB (Ultra-Wideband), LMDS (Local Multiple Distribution Service), IPV4 (Internet Protocol Version 4), IPV6 (Internet Protocol Version 6), DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial), etc. Further, step 37 starts with the operator of the external terminal installing the Sports Retronic Playmaker Software, this software a Digital Video Disk (DVD), USB Flash Drive, Internet Link Download, or a Compact Disc Read-Only Memory (CDROM). Upon downloading the (SRP) Software it may be stored in the form of Volatile or nonvolatile memory 10 such as, for example, a Read Only Memory (ROM), whether erasable or rewritable or not, or in the form of memory 10 such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like.

Step 38, in addition to downloading (SRP) the user further store each Sports Retronic Band and/or Sports Retronic Coach 1 (WCTI) onto the (SRP) interface first screen. For example, this may be from a drop-down menu or a side panel on the (SRP) interface first screen, this allows the controller of the (SRP) to group Sport Retronic Bands and/or Wrist Coaches 1 (WCTI) together or single out a specific Sport Retronic Band and/or Wrist Coach 1. For example, the Sports Retronic Band and/or Wrist Coach 1 (WCTI) function and preform task operations as a Mobile Phone-Number, Cellular Data Network address, WLAN String Address, IPv4 Address, IPv6 Address, Mobile IP Address, Static IP Address, and Dynamic IP Address. This identifier allow the controller of the (SRP) to specifically identify a Sport Retronic Band and/or Wrist Coach 1, and help ensure that the (SRP) multimedia data information is precisely transmitted over a wireless communication network to grouped or a specific Sports Retronic Band and/or Wrist Coach 1.

Hence, step 39 is preformed when the said external terminal and Sport Retronic Band and/or Wrist Coach 1 are connected to a wireless communication network, substantially the operator of the (SRP) create a formation via the (SRP) interface first screen. Furthermore, the desired formation is created, the operator of the (SRP) application group each Sports Retronic Band and/or Wrist Coach 1 intended to receive the (SRP) multimedia file this grouping task executed from a drop-down menu or a side panel on the (SRP) interface first screen. The operator of the (SRP) then transmit the (SRP) multimedia file to the grouped Sports Retronic Band and/or Wrist Coach 1 via a wireless communication network.

Figure 5:
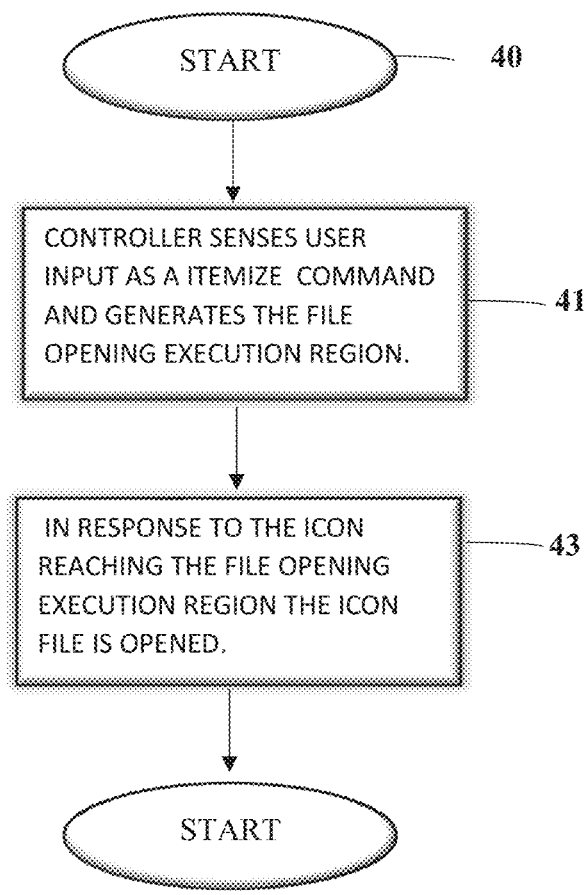
FIG. 5 is a shape diagram of the method steps of executing viewing a (SRP) multimedia file on an Sports Retronic Band and/or Wrist Coach.
Figure 5B:
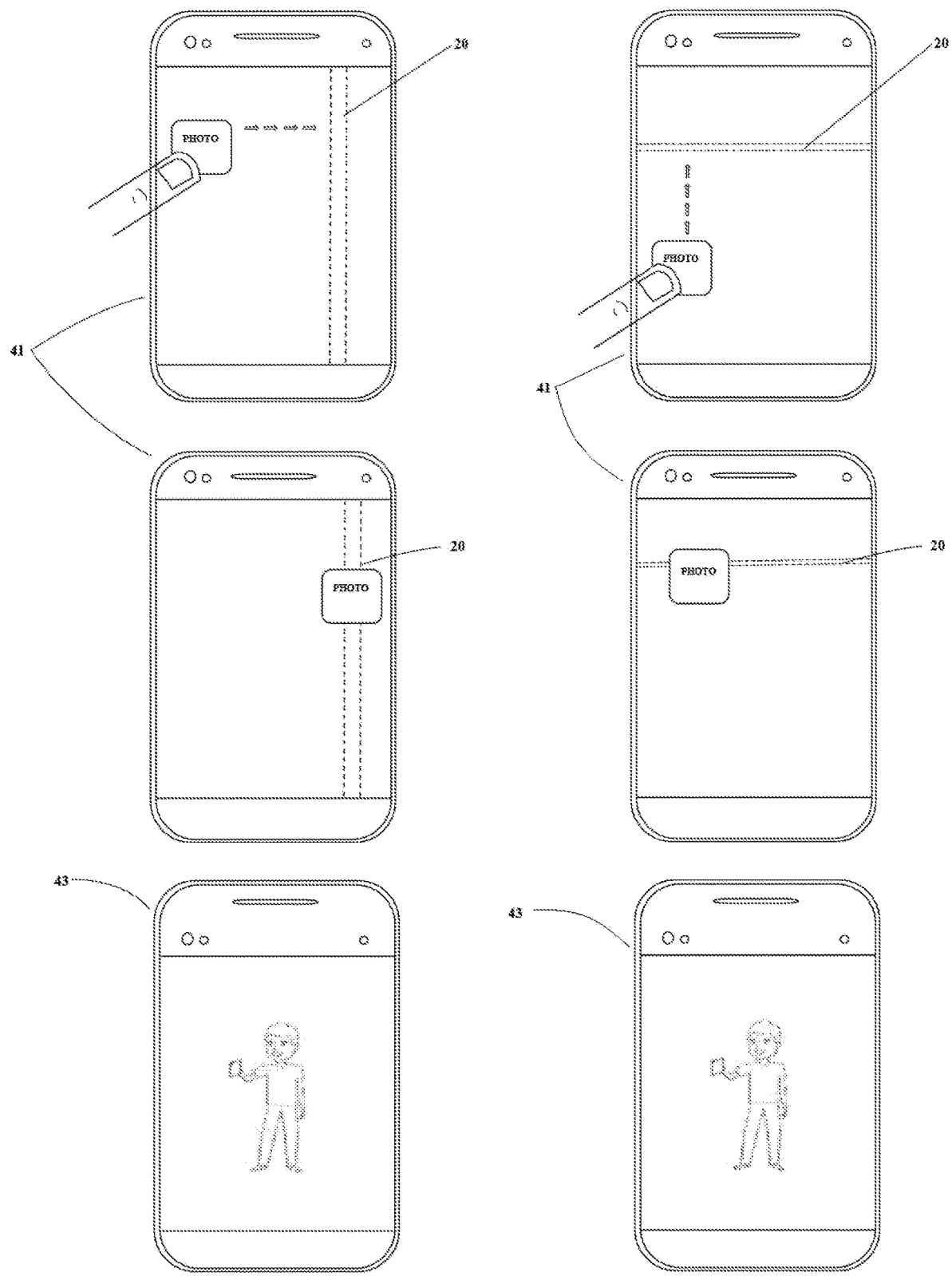
FIG. 5B is an illustration of FIG. 5.

Referring to FIG. 5 method 40 begins with step 41 for flicking icon mode. Upon the Sports Retronic Band and/or Wrist Coach 1 controller 19 receiving an (SRP) multimedia file the Sports Retronic Band and/or Wrist Coach 1 may receive a push notification confirming the transmission of the transmitted (SRP) multimedia file this notification may be a special ringtone and/or a vibration. In respect of the wireless communication network via the wireless communication module 13, the controller 19 multimedia codec may execute processing task of the (SRP) raw multimedia data information in which the (SRP) multimedia data information is processed into a viewable multimedia file. Step 41, whereas the transmitted (SRP) multimedia file icon may be shown on upper left-hand corner of the Sports Retronic Band or Wrist Coach 1 display 6 first screen. Upon, a user first input first signal to the input module 20 in respect of the touch panel 5 sensing a user first input signal (ex. pressure input) on the file icon on the display 6, the controller 19 recognize this (pressure input) command as an icon selection and/or itemizing command in response of the user input signal to the input module 20, while the said icon is itemized a user flick the icon to the right-hand side of the display 6, for example the itemized icon will appear as if it was actually tossed or flicked from one side of the display 6 to the other.

Whereas in response to the itemize command the controller 19 set an file opening execution region 20 on the display 6. While on the other hand the display 6 display the file opening execution region 20. The file opening execution region 20 a vertical dashed line(s) set to the middle-right of the display 6. However, the size and number of vertical dashed line(s) displayed on the screen are not limited thereto and the vertical dashed line(s) may be variably configured. Although the controller 19 is executed to a file opening execution region 20, the display 6 may not display the file opening execution region 20 (vertical dashed lines). Namely, the file opening execution region 20 (vertical dashed lines) only internally set, without being displayed on the screen, by the controller 19. Step 43, whereas upon the file icon reaching the file opening execution region 20 (vertical dashed lines) the controller 19 execute the opening of the file. This information may be output on the first screen of the Sports Retronic Band and/or Wrist Coach 1 display 6 portion. Further, in respect of the first screen output information the (SRP) multimedia file may be opened in a second screen, this second screen may be the opening of the (SRP) multimedia file in the (SRV) Application. Further, with the (SRV) Application a user may view the (SRP) multimedia file on the Sports Retronic Band and/or Wrist Coach 1 or transmit the file to the projector 23. Hence, transferring the (SRP) multimedia file to the projector 23 by a user first input first signal to the input module 20 this input may be directed towards an icon on the display 6 labeled project image upon an input signal the controller 19 may recognize this command as to projecting an image through the projector 23 execution command, this information may also be output on the (SRV) Application interface first screen on the Sports Retronic Band and/or Wrist Coach 1 display 6.

Figure 6:
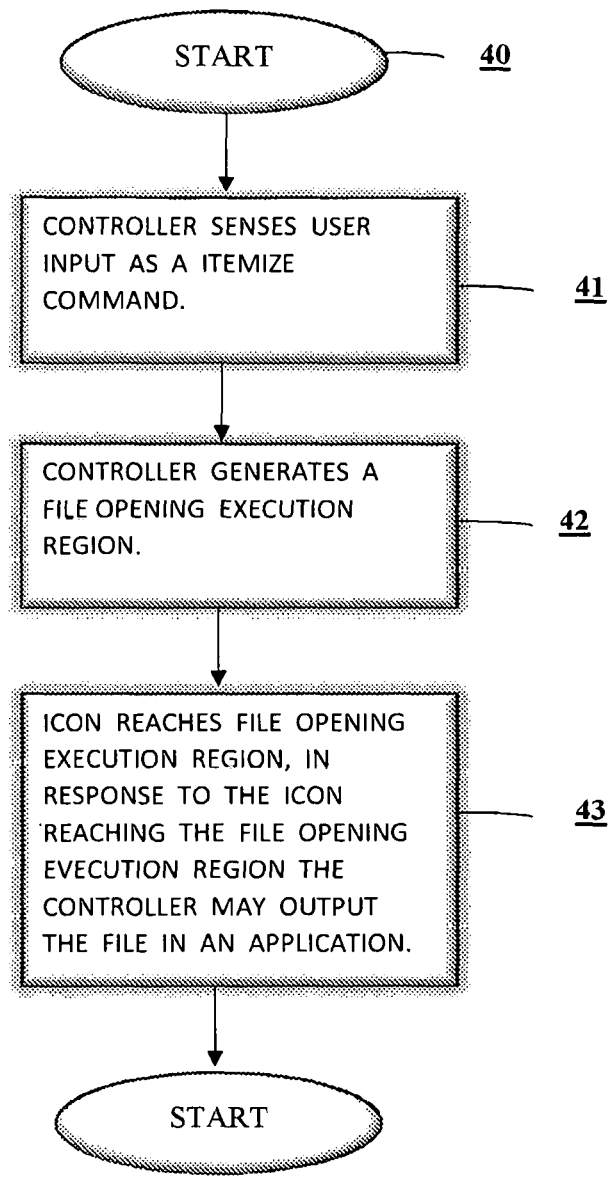
FIG. 6 is a shape diagram of method steps of controlling the Sports Retronic Band and/or Wrist Coach.

Referring to FIG. 6 method 44 starts with step 45. More specifically this method 44 pertains to when a user of the Sports Retronic Band and/or Wrist Coach 1 receives a (SRP) multimedia file from a external terminal, upon opening the flap portion of the Sports Retronic Band and/or Wrist Coach 1 the (SRP) multimedia file may be automatically output on the display 6 this may be known as automatic multimedia viewing mode. To perform this, the sensing module 16 may incorporate a (optical) proximity sensor 27 that may be able to detect a plastic and/or metal target in nominal range by emitting an electromagnetic field or a beam of electromagnetic radiation (infrared) from a (short distance) light emitting element, and may look for changes in the field or return signal.

Step 45, whereas upon opening the flap portion in a partial opening state with respect to the Sports Retronic Band and/or Wrist Coach 1 the light emitting element may emit a beam of electromagnetic radiation (infrared) towards the flap portion detecting a metal or plastic target in response outputting detected target signals to the proximity sensor 27 circuitry whereas the controller 19 may continue to delay opening the multimedia file until no metal or plastic target detected return signals is sensed by the proximity sensor 27. Step 46 whereas when the flap portion reaches a vertical 90 degree angle the flap portion is no longer in reach of the beams emitted from the light emitting element. In response of the flap portion being out of reach of the beams emitted, the light emitting element may detect an non-metal or non-plastic target, further detecting a non-metal and/or plastic target in respect of the flap portion the light emitting element may output a no target detected return signal to an circuit.

Step 47 whereas the proximity sensor 27 may transmit no metal or plastic target detected return signals to the controller 19 in relations to the (SRP) multimedia file transmitted from the external terminal held by the controller 19 during the partial opening of the flap portion, the controller 19 may recognize this signal as file opening execution command to whereas the (SRP) multimedia file may be open in the viewer application.

In the embodiments of the present invention, the foregoing method(s) can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The Sports Retronic Band and/or Wrist Coach 1 according to the embodiments of the present disclosure is not limited in its application of the configurations and methods, but the entirety or a portion of the embodiments can be selectively combined to be configured into various modifications. As the exemplary embodiments may be implemented in several forms without departing from the characteristics thereof, it should also be understood that the above described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Having described my invention, I claim:

1. A terminal comprising:
    a controller; and
    a display coupled to the controller;
    wherein the controller is configured to generate a file opening executing region to facilitate opening of a file, and wherein the file opening executing region is generated at a predetermine location of the display in response to a user pressing a file icon on the display, and wherein the location of the file opening executing region is determined based on a location of the file icon on the display;
    wherein the file is configured to open when the file icon is moved from the location of the file icon to the file opening executing region of the display by the user.

2. The terminal of claim 1, whereas the file opening execution region is generated at middle-right portion of the display if the file icon is located at left-hand side portion of the display, wherein the file opening execution region is formed by at least one vertical dashed line.

3. An non-transitory computer-readable storage medium, comprising instructions for: generating a file opening executing region to facilitate opening of a file, and wherein the file opening executing region is generated at a predetermine location of the display in response to a user pressing on a file icon on the display, and wherein the location of the file opening execution region is determined based on a location of the file icon on the display; and opening the file when the file icon is moved from the location of the file icon to the file opening executing region of the display by the user.

4. The non-transitory computer-readable storage medium of claim 3, whereas the file opening execution region is generated at middle-right portion of the display if the file icon is located at a left-hand side portion of the display, wherein the file opening execution region is formed by at least one vertical dashed line.

5. The non-transitory computer-readable storage medium of claim 3, whereas the file opening execution region is generated at middle portion of the display if the file icon is located at bottom portion of the display, wherein the file opening execution region is formed by at least one horizontal dashed line.

* * * * *